(12) United States Patent
Kaneko et al.

(10) Patent No.: US 11,204,188 B2
(45) Date of Patent: Dec. 21, 2021

(54) AIR-CONDITIONING DEVICE

(71) Applicant: HITACHI-JOHNSON CONTROLS AIR CONDITIONING, INC., Tokyo (JP)

(72) Inventors: Hiroaki Kaneko, Tokyo (JP); Shoutaro Yamamoto, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 117 days.

(21) Appl. No.: 16/444,162

(22) Filed: Jun. 18, 2019

(65) Prior Publication Data

US 2020/0173694 A1 Jun. 4, 2020

Related U.S. Application Data

(63) Continuation of application No. PCT/JP2018/044169, filed on Nov. 30, 2018.

(51) Int. Cl.
*F25B 13/00* (2006.01)
*F25B 1/00* (2006.01)

(52) U.S. Cl.
CPC ............ *F25B 13/00* (2013.01); *F25B 1/00* (2013.01); *F25B 2313/005* (2013.01);
(Continued)

(58) Field of Classification Search
CPC ........ F25B 2313/025; F25B 2313/0253; F25B 2600/025; F25B 45/00; F25B 2600/11;
(Continued)

(56) References Cited

U.S. PATENT DOCUMENTS 10,082,320 B2 * 9/2018 Korenaga ............... F25B 13/00
10,337,769 B2 * 7/2019 Oka ........................ F25B 49/02
(Continued)

FOREIGN PATENT DOCUMENTS

EP 2 375 188 A1 10/2011
JP 3601130 B2 * 12/2004
(Continued)

OTHER PUBLICATIONS

Nakabo Machine Translation (Year: 2004).*
(Continued)

*Primary Examiner* — Frantz F Jules
*Assistant Examiner* — Rodrigo Royo
(74) *Attorney, Agent, or Firm* — Mattingly & Malur, PC

(57) ABSTRACT

An air-conditioning device including multiple outdoor units and an indoor unit through a pipe includes a control section that obtains a degree of subcooling at an outlet of a subcooling circuit of each outdoor unit based on a temperature detected by a temperature sensor that detects the temperature of refrigerant having passed through the subcooling circuit of each outdoor unit, obtain a target value of the degree of subcooling based on the obtained multiple degrees of subcooling, and perform the control of increasing the rotation speed of a compressor of an outdoor unit having a higher degree of subcooling than the target value and decreasing the rotation speed of a compressor of an outdoor unit having a lower degree of subcooling than the target value such that a difference in the degree of subcooling at the outlet of the subcooling circuit of each outdoor unit is decreased.

8 Claims, 4 Drawing Sheets

(52) U.S. Cl.
CPC ............... *F25B 2313/02742* (2013.01); *F25B 2313/0315* (2013.01); *F25B 2345/001* (2013.01); *F25B 2600/19* (2013.01)

(58) Field of Classification Search
CPC ............ F25B 2600/0253; F25B 49/022; F25B 49/025; F25B 2400/075; F25B 2400/0751
See application file for complete search history.

(56) References Cited

U.S. PATENT DOCUMENTS

| | | | |
|---|---|---|---|
| 10,415,846 B2* | 9/2019 | Okochi | F24F 11/76 |
| 2006/0137366 A1* | 6/2006 | Kang | F25B 45/00 |
| | | | 62/149 |
| 2011/0011080 A1* | 1/2011 | Ogata | F25B 9/06 |
| | | | 60/524 |

FOREIGN PATENT DOCUMENTS

| | | | | |
|---|---|---|---|---|
| JP | 4803237 B2 | 10/2011 | | |
| JP | 2011208928 A * | 10/2011 | ............ | F25B 49/005 |
| JP | 2015-081722 A | 4/2015 | | |
| WO | WO-2004088212 A1 * | 10/2004 | ............ | F25B 49/025 |

OTHER PUBLICATIONS

Chuma machine translation (Year: 2004).*
Naito machine translation (Year: 2011).*
International Search Report and Written Opinion of PCT/JP2018/044169 dated Feb. 12, 2019.

* cited by examiner

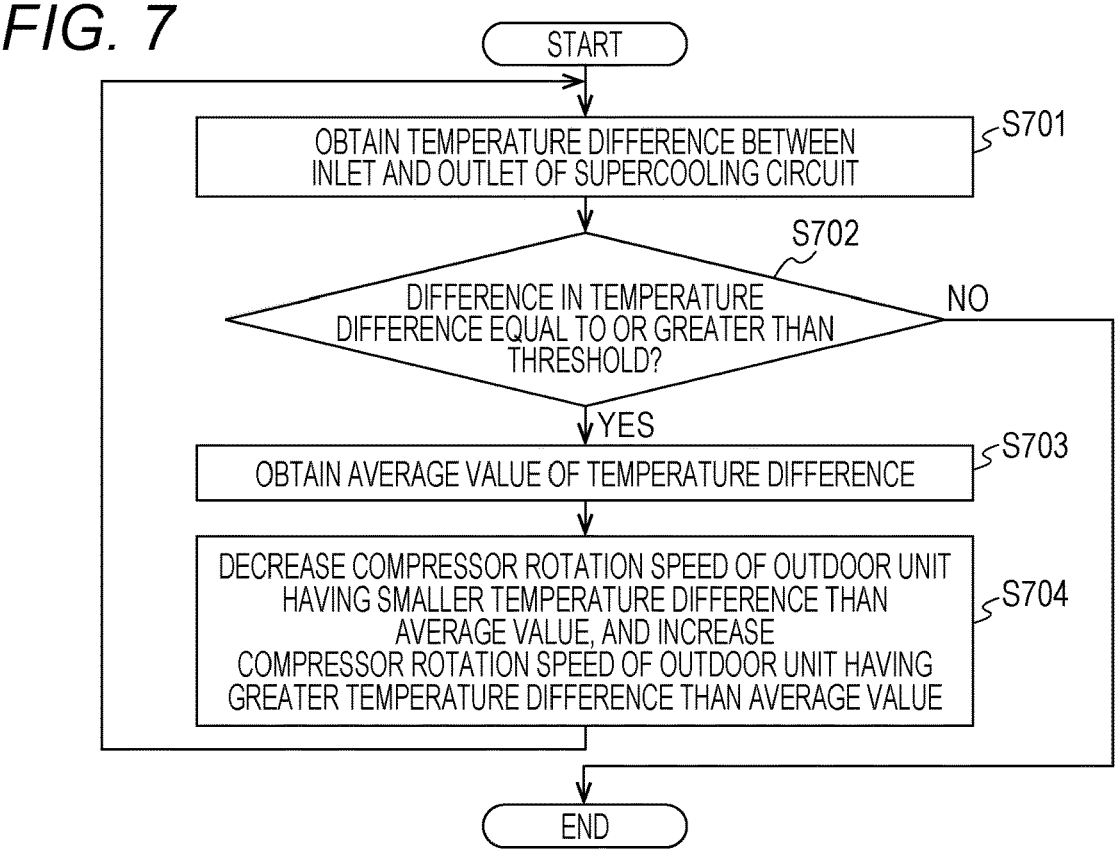
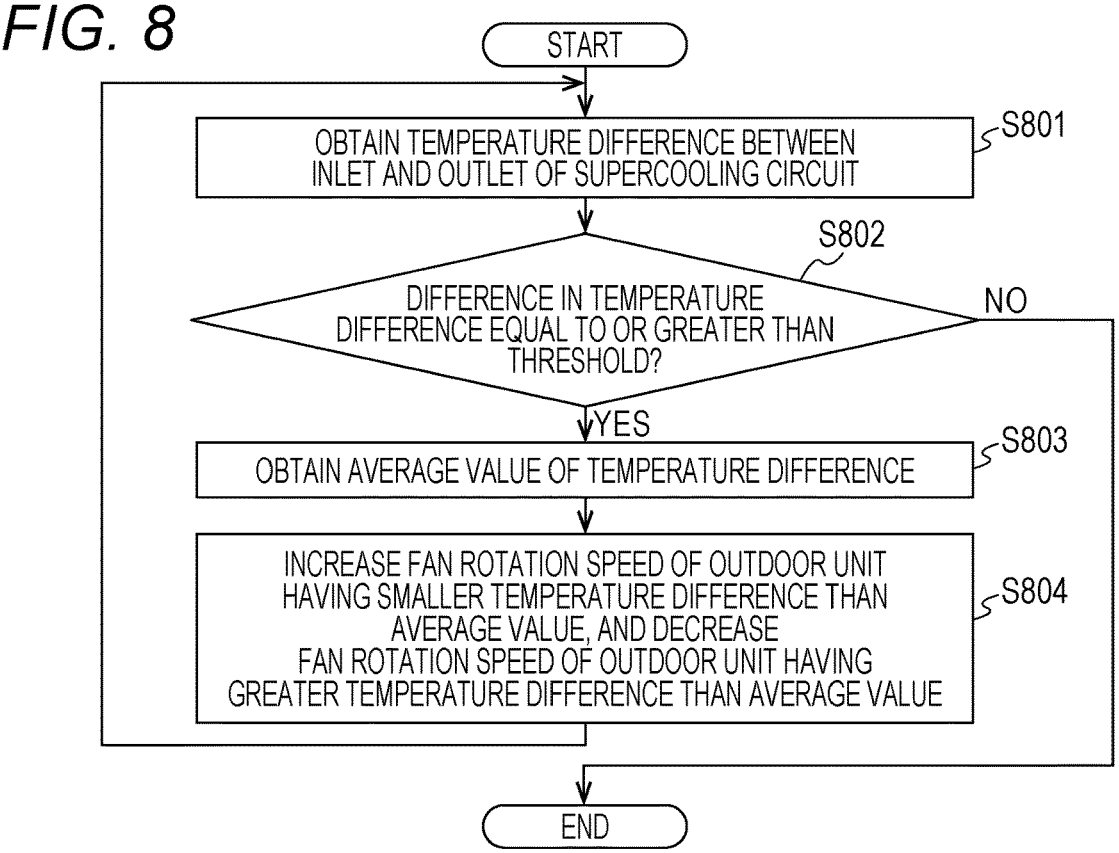

AIR-CONDITIONING DEVICE

CROSS-REFERENCE TO RELATED APPLICATION

This application is a continuation application of PCT/JP2018/044169, filed on Nov. 30, 2018, the entire contents of which are incorporated herein by reference.

TECHNICAL FIELD

The present invention relates to an air-conditioning device.

BACKGROUND ART

In the case of an air-conditioning device including multiple outdoor units, imbalance in a refrigerant amount in condensers of the outdoor units is caused upon determination on the refrigerant amount in refrigerant charging operation, and in some cases, a proper refrigerant amount for a refrigeration cycle cannot be determined.

Patent Document 1 describes, as refrigerant amount balance control among the outdoor units, an example where the degree of subcooling at a condenser outlet of an outdoor unit is determined and a compressor rotation speed on a lower subcooling degree side is decreased as compared to a compressor rotation speed on a higher subcooling degree side and an example where a fan rotation speed on the lower subcooling degree side is increased as compared to a fan rotation speed on the higher subcooling degree side.

CITATION LIST

Patent Document

Patent Document 1: Japanese Patent No. 4803237

SUMMARY OF THE INVENTION

Problems to be Solved by the Invention

In Patent Document 1, a refrigerant amount in refrigerant charging operation is determined using the degree of subcooling at the condenser outlet of the outdoor unit, assuming that the degree of subcooling can be properly obtained at the condenser outlet of each outdoor unit. However, when refrigerant at the condenser outlet of the outdoor unit is in a two-phase state, no temperature change is shown. Thus, even with a refrigerant specific enthalpy change, such a refrigerant specific enthalpy change cannot be determined, and the degree of subcooling at the condenser outlet of the outdoor unit cannot be properly obtained. As a result, there is a problem that the refrigerant amount in the refrigerant charging operation cannot be properly determined.

For this reason, the present invention is intended to properly determine the amount of refrigerant charged to a refrigerant circuit.

Solutions to the Problems

The present invention relates to an air-conditioning device including multiple outdoor units and an indoor unit connected to the multiple outdoor units through a pipe. The air-conditioning device includes a control section configured to obtain, before refrigerant charging to a refrigerant circuit including the multiple outdoor units and the indoor unit is completed, a degree of subcooling at an outlet of a subcooling circuit of each outdoor unit based on a temperature detected by a temperature sensor configured to detect the temperature of refrigerant having passed through the subcooling circuit of each outdoor unit, obtain a target value of the degree of subcooling based on the obtained multiple degrees of subcooling, and perform a control of increasing a rotation speed of a compressor of an outdoor unit having a higher degree of subcooling than the target value and decreasing the rotation speed of a compressor of an outdoor unit having a lower degree of subcooling than the target value such that a difference in the degree of subcooling at the outlet of the subcooling circuit of each outdoor unit is decreased.

Effects of the Invention

According to the present invention, the amount of refrigerant charged to the refrigerant circuit can be properly determined.

BRIEF DESCRIPTION OF THE DRAWINGS

FIG. 7 is a flowchart of one example of refrigerant amount balance control processing of the third embodiment.

FIG. 8 is a flowchart of one example of refrigerant amount balance control processing of a fourth embodiment.

DESCRIPTION OF THE EMBODIMENTS

Hereinafter, embodiments of the present invention will be described with reference to the drawings.

First Embodiment

Figure 1:
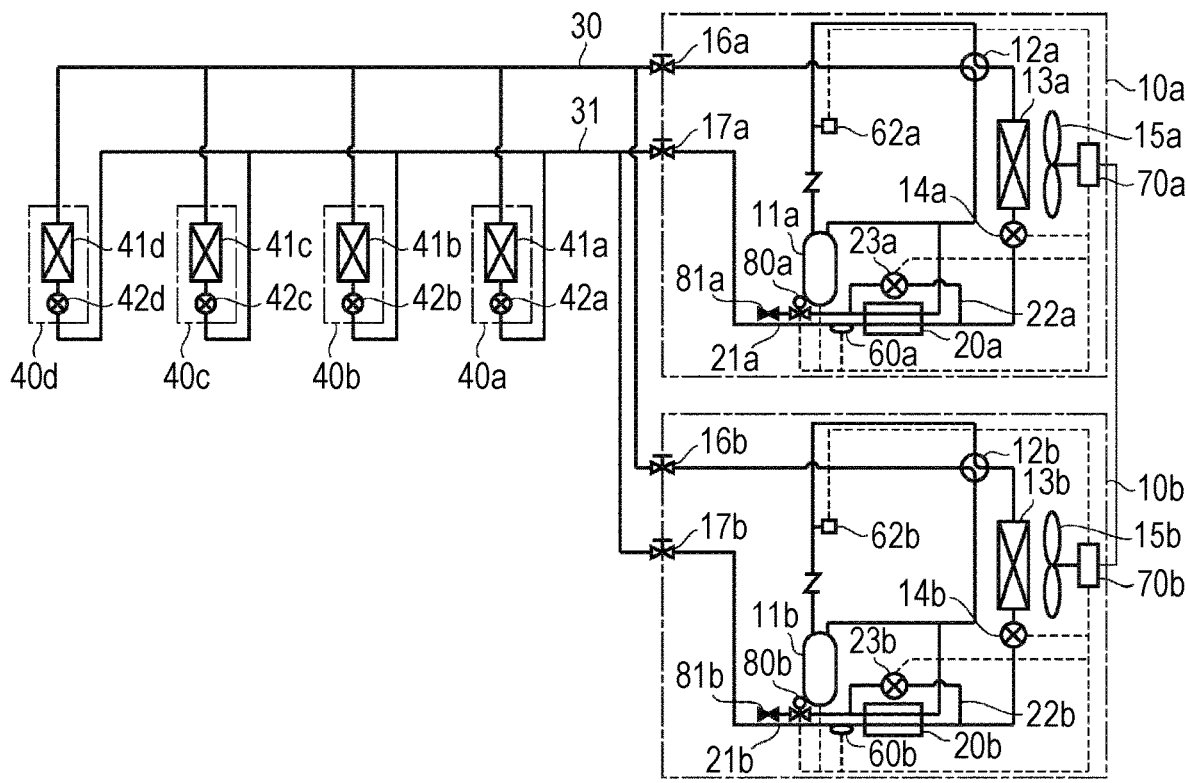
FIG. 1 is a diagram of one example of an outline configuration of an air-conditioning device of a first embodiment.

A first embodiment will be described. FIG. 1 is a diagram of one example of an outline configuration of an air-conditioning device of the first embodiment. The air-conditioning device is configured such that outdoor units 10$a$, 10$b$ and indoor units 40$a$, 40$b$, 40$c$, 40$d$ are connected to each other through a liquid pipe 31 and a gas pipe 30 to form a closed circuit. The closed circuit is sealed with refrigerant, and the refrigerant circulates to implement a refrigeration cycle. The number of connected outdoor units 10 described herein may be two or more as long as multiple units are provided. The number of connected indoor units 40 may be one. The outdoor unit 10$a$ is one example of a control device of the air-conditioning device.

First, a configuration of the outdoor unit 10$a$ will be described. The outdoor unit 10$a$ is configured such that a compressor 11$a$ whose rotation frequency is variable by an inverter, a four-way valve (a reversible valve) 12$a$, an outdoor heat exchanger 13$a$ configured to exchange heat with outdoor air, an outdoor expansion valve 14a including an electronic expansion valve etc. for adjusting the flow rate of refrigerant in the outdoor heat exchanger 13a, a subcooling circuit 20a, a gas blocking valve 16a, a liquid blocking valve 17a, etc. are connected to each other through a pipe. Moreover, a subcooling bypass pipe 22a as a cooling source of the subcooling circuit 20a is provided at the outdoor unit 10a. The subcooling bypass pipe 22a is provided such that part of refrigerant sent from the outdoor expansion valve 14a to the liquid pipe 31 returns to the compressor 11a. More specifically, the subcooling bypass pipe 22a extends from between the outdoor expansion valve 14a and the subcooling circuit 20a, and is connected to a suction port side of the compressor 11a through the subcooling circuit 20a. Further, a subcooling expansion valve 23a configured to adjust the flow rate of refrigerant flowing in the subcooling bypass pipe 22a is provided at the subcooling bypass pipe 22a.

A subcooling circuit outlet temperature sensor 60a is provided at the pipe in the vicinity of an outlet of the subcooling circuit 20a. The subcooling circuit outlet temperature sensor 60a detects the temperature of refrigerant at the pipe in the vicinity of the outlet of the subcooling circuit 20a. Moreover, a refrigerant charging port 81a as a refrigerant charging opening is provided at the subcooling bypass pipe 22a, and a refrigerant charging electromagnetic valve 80a for refrigerant charging is provided downstream of the refrigerant charging port 81a. Upon charging, a refrigerant tank sealed with refrigerant is connected to the refrigerant charging port 81a through a charging hose. Moreover, a high-pressure sensor 62a configured to detect the pressure of gas refrigerant discharged from the compressor 11a is provided at the discharge-side pipe of the compressor 11a.

Moreover, a control section 70a configured to control operation of the outdoor unit 10a is provided at the outdoor unit 10a. The control section 70a is connected to an outdoor fan 15a, the high-pressure sensor 62a, the outdoor expansion valve 14a, the subcooling expansion valve 23a, the subcooling circuit outlet temperature sensor 60a, the compressor 11a, the refrigerant charging electromagnetic valve 80a, and a control section 70b of the outdoor unit 10b so that a signal can be transmitted or received through a signal line. A configuration of the outdoor unit 10b is also similar to the configuration of the outdoor unit 10a. Hereinafter, description will be made assuming that the control section 70a also transmits a signal to the control section 70b and also control the outdoor unit 10b via the control section 70b.

Next, a configuration of the indoor unit 40a will be described. The indoor unit 40a is configured such that an indoor heat exchanger 41a configured to exchange heat with indoor air and an indoor expansion valve 42a including an electronic expansion valve etc. for adjusting the flow rate of refrigerant in the indoor heat exchanger 41a are connected to each other through a pipe. Configurations of the indoor unit 40b, the indoor unit 40c, and the indoor unit 40d are similar to the configuration of the indoor unit 40a.

Figure 2:
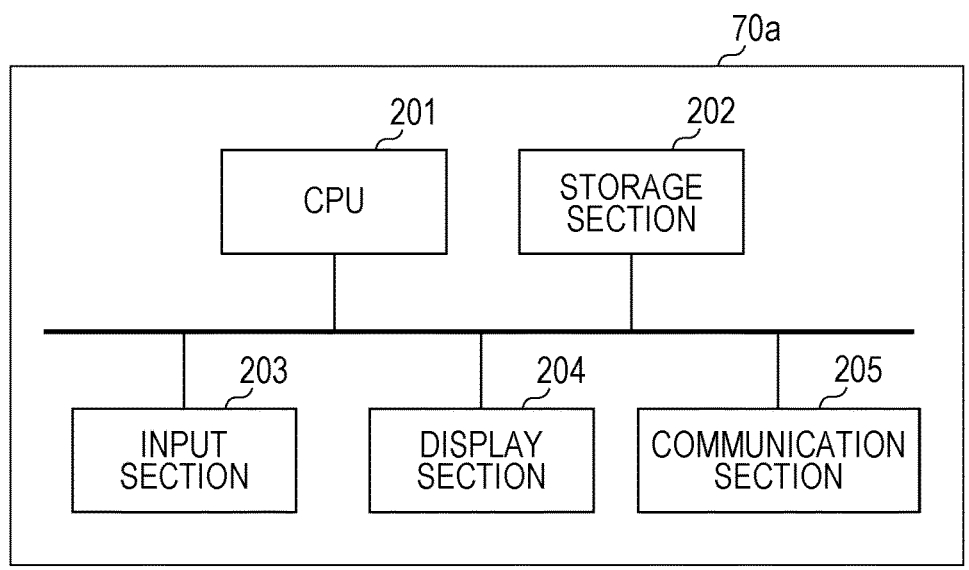
FIG. 2 is a diagram of one example of a hardware configuration of a control section.

FIG. 2 is a diagram of one example of a hardware configuration of the control section 70a. The control section 70a includes a CPU 201, a storage section 202, an input section 203, a display section 204, and a communication section 205. The CPU 201 reads a program stored in the storage section 202 to execute processing. The storage section 202 is used as a primary storage area, such as a main memory or a working area, upon execution of the processing by the CPU 201, and stores data (e.g., each threshold described later), programs, etc. used upon execution of the processing by the CPU 201. The storage section 202 is one example of a storage medium. The input section 203 is, for example, a button, and receives operation by a user to input such operation to the CPU 201. The display section 204 is, for example, a display, and displays a result of the processing by the CPU 201. The communication section 205 communicates with the outdoor unit 10b etc. via the signal line. The functions and processing of the control section 70a are implemented in such a manner that the CPU 201 executes the processing based on the programs stored in the storage section 202. Part of the functions and processing of the control section 70a may be, as another example, implemented using a hardware circuit. A hardware configuration of the control section 70b is also similar to the hardware configuration of the control section 70a.

The control section 70a according to the first embodiment performs the processing of balancing a refrigerant amount between the outdoor units 10a, 10b upon refrigerant charging for the air-conditioning device. Upon refrigerant charging, it is necessary to determine whether or not the amount of refrigerant charged to the air-conditioning device is proper. Upon determination on the refrigerant amount, the refrigerant amount needs to be balanced between the outdoor units 10a, 10b. However, in some cases, the balance in the refrigerant amount between the outdoor units is not achieved due to an external factor etc. On the other hand, the air-conditioning device of the present embodiment adjusts the balance in the refrigerant amount by the control of the control section 70a, and in a state in which a proper balance in the refrigerant amount is achieved, determines whether or not the refrigerant amount is proper.

Refrigerant charging will be described in advance of the processing of the control section 70a. First, the outdoor units 10a, 10b and the indoor units 40a to 40d are placed, and are connected to each other through the gas pipe 30 and the liquid pipe 31. Note that the outdoor units 10a, 10b are sealed with a predetermined amount of refrigerant. After vacuuming has been performed for the inside of the refrigerant pipe on a side close to the indoor units 40a to 40d, the gas blocking valves 16a, 16b and the liquid blocking valves 17a, 17b of the outdoor units 10a, 10b are opened, and a refrigerant circuit is filled with the refrigerant sealed in the outdoor units 10a, 10b.

Next, for charging refrigerant, a worker connects the refrigerant charging port 81a of the outdoor unit 10a and the refrigerant tank sealed with refrigerant to each other through the charging hose. After completion of connection, the worker performs the operation of starting refrigerant charging operation for the input section 203 with a valve of the refrigerant tank being opened. When the operation of starting the refrigerant charging operation for the input section 203 is performed, the outdoor units 10a, 10b start the refrigerant charging operation by a signal of the CPU 201. When it is, during the refrigerant charging operation, determined that refrigerant charging is necessary, the CPU 201 transmits a predetermined signal to the refrigerant charging electromagnetic valve 80a. When receiving the predetermined signal, the refrigerant charging electromagnetic valve 80a opens. When the refrigerant charging electromagnetic valve 80a is opened with the valve of the refrigerant tank being opened, the refrigerant circuit is filled with the refrigerant of the refrigerant tank.

In the air-conditioning device of the first embodiment, refrigerant is charged when cooling operation is performed for the outdoor units 10a, 10b and the indoor units 40a, 40b, 40c, 40d. In the cooling operation, the outdoor units 10a, 10b and the compressors 11a, 11b are operated, and the four-way valves 12a, 12b are brought to such a direction that the gas pipe 30 and a compressor suction pipe are connected to each other and the outdoor heat exchangers 13a, 13b and a compressor discharge pipe are connected to each other. The flow of refrigerant is in the same direction between the outdoor units 10a, 10b, and therefore, the outdoor unit 10a will be described as a representative. High-pressure gas refrigerant compressed in the compressor 11a is sent to the four-way valve 12a and the outdoor heat exchanger 13a, and then, by heat exchange with outdoor suction air, is condensed into high-pressure liquid refrigerant. Then, such refrigerant passes through the outdoor expansion valve 14a. At this point, liquid pressure is slightly decreased due to resistance of the expansion valve. Then, the refrigerant is branched into the subcooling bypass pipe 22a and the subcooling circuit 20a. The bypassed liquid refrigerant is depressurized in the subcooling expansion valve 23a, and by heat exchange with the remaining unbypassed liquid refrigerant, is gasified and sent to a compressor suction side. Meanwhile, the unbypassed liquid refrigerant is cooled in the subcooling circuit 20a, and is sent to a subcooling circuit outlet pipe 21a and the liquid pipe 31. Similarly, high-pressure liquid refrigerant is also sent from the outdoor unit 10b to the liquid pipe 31, and joins the unbypassed liquid refrigerant. The refrigerant is used for the cooling operation in each of the indoor units 40a, 40b, 40c, 40d, and turns into low-pressure gas refrigerant. The low-pressure gas refrigerant flowing out of each indoor unit is branched into the compressor suction sides of the outdoor units 10a, 10b through the gas pipe 30, and is compressed and circulates again.

Figure 3:
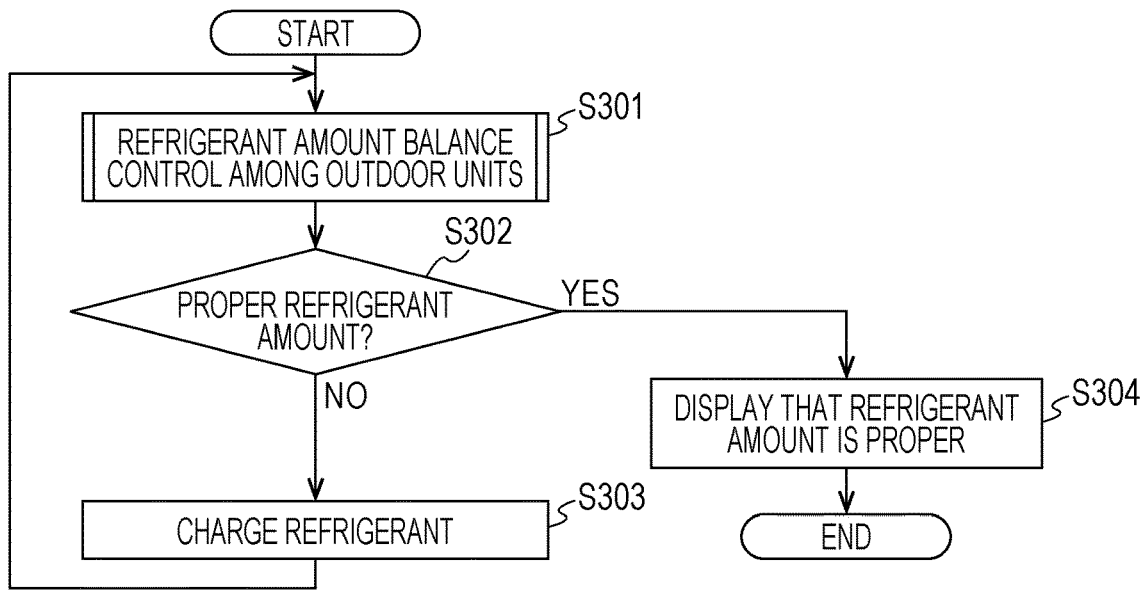
FIG. 3 is a flowchart of one example of information processing.

FIG. 3 is a flowchart of refrigerant charging control processing performed by the control section 70a. The refrigerant charging control processing is processing executed during the refrigerant charging operation by the cooling operation as described above.

At S301, the CPU 201 performs the control of balancing the refrigerant amount between the outdoor unit 10a and the outdoor unit 10b. Details of the processing of S301 will be described with reference to FIGS. 4 and 5 etc. described later.

At S302, the CPU 201 determines, after execution of later-described standby processing, whether or not the refrigerant amount (a charging amount) of the air-conditioning device is proper. The CPU 201 performs, as the standby processing, such control that the outdoor expansion valves 14a, 14b of the outdoor units 10a, 10b are substantially fixedly stabilized at a fixed opening degree (may be the maximum opening degree) and the rotation speeds (the air volumes) of the outdoor fans 15a, 15b are substantially fixedly stabilized at a value corresponding to a cycle state. More specifically, the CPU 201 stands by for a certain period of time. Then, in a stable state, the CPU 201 makes determination on the refrigerant amount of the air-conditioning device. The CPU 201 obtains an average temperature based on the temperature detected by the subcooling circuit outlet temperature sensor 60a of the outdoor unit 10a and a temperature detected by a subcooling circuit outlet temperature sensor 60b of the outdoor unit 10b, and based on whether or not the average temperature is equal to or lower than a preset threshold, determines whether or not the refrigerant amount of the air-conditioning device is proper. In a case where the average temperature is equal to or lower than the threshold, the CPU 201 determines that the refrigerant amount of the air-conditioning device is proper. On the other hand, in a case where the average temperature exceeds the threshold, the CPU 201 determines that the refrigerant amount of the air-conditioning device is not proper. When the CPU 201 determines that the refrigerant amount of the air-conditioning device is not proper (insufficient), the processing proceeds to S303. When the CPU 201 determines that the refrigerant amount of the air-conditioning device is proper, the processing proceeds to S304.

At S303, the CPU 201 charges refrigerant to the refrigerant circuit. The CPU 201 sends the predetermined signal to the refrigerant charging electromagnetic valve 80a to open the refrigerant charging electromagnetic valve 80a for a predetermined period of time, thereby charging a predetermined amount of refrigerant to the refrigerant circuit. The predetermined period of time as described herein may be, for example, determined by the CPU 201 etc. according to an external air temperature. Moreover, the predetermined amount is not limited to a fixed amount, and for example, may vary according to one or both of a refrigerant state in the cycle and a tank remaining amount. Then, the CPU 201 returns to the processing of S301, and after the control of balancing the refrigerant amount has been performed, executes S302 to make determination on the refrigerant amount again.

At S304, the CPU 201 displays, on the display section 204, that the amount of charged refrigerant is proper. When the CPU 201 displays, on the display section 204, that the amount of charged refrigerant is proper, the refrigerant charging control processing ends. When the refrigerant charging control processing ends, refrigerant charging is completed. In a case where the display section 204 displays that the amount of charged refrigerant is proper, the worker detaches, for example, the charging hose from the refrigerant charging port 81a to terminate a refrigerant charging process.

Next, the principle of balancing the refrigerant amount between the outdoor units will be described. First, the amount of refrigerant in the outdoor heat exchanger is generally greater as a heat exchanger outlet specific enthalpy decreases, and is greater as the degree of subcooling increases. For this reason, operation is made such that the heat exchanger outlet specific enthalpy or the degree of subcooling is substantially equal among the multiple outdoor units, and therefore, the balance in the refrigerant amount among the multiple outdoor units can be maintained. A factor influencing the refrigerant state at an outlet of the outdoor heat exchanger is the rotation speed of the compressor. The degree of opening of the outdoor expansion valve also influences the refrigerant state at the outlet of the heat exchanger. However, the control section 70a of the first embodiment controls the rotation speed of the compressor providing greater influence to balance the refrigerant amount.

Figure 4:
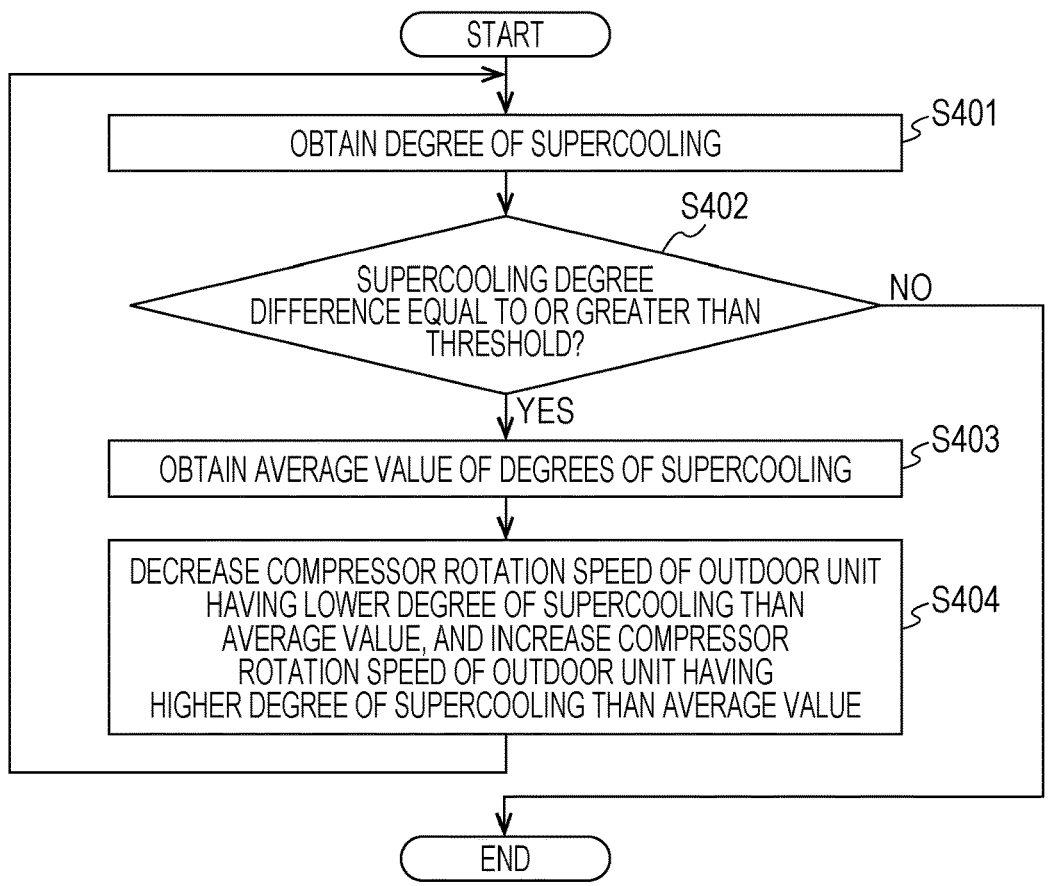
FIG. 4 is a flowchart of one example of refrigerant amount balance control processing of the first embodiment.

FIG. 4 is a flowchart of one example of refrigerant amount balance control processing of the first embodiment. At S401, the CPU 201 obtains the degree of subcooling at the outlet of the subcooling circuit 20a of the outdoor unit 10a based on a difference between the temperature detected by the subcooling circuit outlet temperature sensor 60a of the outdoor unit 10a and a saturated temperature for the pressure detected by the high-pressure sensor 62a. Moreover, the CPU 201 receives, via the control section 70b, the temperature detected by the subcooling circuit outlet temperature sensor 60b of the outdoor unit 10b and a saturated temperature for a pressure detected by a high-pressure sensor 62b. Then, the CPU 201 obtains the degree of subcooling at an outlet of a subcooling circuit 20b of the outdoor unit 10b based on a difference between the temperature detected by the subcooling circuit outlet temperature sensor 60b and the saturated temperature for the pressure detected by the high-pressure sensor 62b. Note that the CPU 201 of the control section 70b may obtain the degree of subcooling at the outlet of the subcooling circuit 20b in the outdoor unit 10b. Then, the CPU 201 of the control section 70a may receive, from the control section 70b, the degree of subcooling at the outlet of the subcooling circuit 20b, the degree of subcooling being obtained by the control section 70b.

At S402, the CPU 201 determines whether or not a difference between the degree of subcooling at the outlet of the subcooling circuit 20a of the outdoor unit 10a and the degree of subcooling at the outlet of the subcooling circuit 20b of the outdoor unit 10b is equal to or greater than a threshold. In a case where the CPU 201 determines that the difference is equal to or greater than the threshold, the processing proceeds to S403. In a case where the CPU 201 determines that the difference is less than the threshold, the refrigerant amount balance control processing ends.

At S403, the CPU 201 obtains an average value of the degree of subcooling based on the degree of subcooling at the outlet of the subcooling circuit 20a of the outdoor unit 10a and the degree of subcooling at the outlet of the subcooling circuit 20b of the outdoor unit 10b. The average value is one example of a target value.

At S404, the CPU 201 performs the control of decreasing the rotation speed of the compressor 11 of the outdoor unit 10 having a lower degree of subcooling than the average value and increasing the rotation speed of the compressor 11 of the outdoor unit 10 having a higher degree of subcooling than the average value. Although the principle thereof will be described later, the degree of subcooling of the outdoor unit increases as the rotation speed of the compressor decreases, and decreases as the rotation speed of the compressor increases. Thus, by the present processing, a difference in the degree of subcooling among the multiple outdoor units can be decreased.

The processing of S404 will be described in more details. The CPU 201 determines the rotation speed of each compressor 11 such that the increment of the rotation speed of the compressor 11 of the outdoor unit 10 having a higher degree of subcooling than the average value and the decrement of the rotation speed of the compressor 11 of the outdoor unit 10 having a lower degree of subcooling than the average value are equal to each other. Examples of the increment and the decrement are two hertzes (Hz). That is, the CPU 201 increases, by two hertzes, the rotation speed of the compressor 11 of the outdoor unit 10 having a higher degree of subcooling than the average value, and decreases, by two hertzes, the rotation speed of the compressor 11 of the outdoor unit 10 having a lower degree of subcooling than the average value. The amount of change in a frequency by the CPU 201 does not depend on the average value and the subcooling degree difference, and is fixed. After the processing of S404, the CPU 201 proceeds to S401.

A relationship between the degree of subcooling and the rotation speed of the compressor will be described herein. As the rotation speed of the compressor decreases, only a refrigerant circulation amount Gr decreases with almost no change in a heat exchange amount Qc=KA (Tc-Ta) obtained from an air side, and therefore, Hi-Ho increases. An outdoor heat exchanger inlet refrigerant specific enthalpy Hi shows little change, and therefore, an outdoor heat exchanger outlet refrigerant specific enthalpy Ho decreases (see Expression 1). That is, a subcooling circuit inlet refrigerant specific enthalpy decreases (Hsi=Ho), and therefore, in the case of a fixed subcooling circuit capacity Qsc, a subcooling circuit outlet refrigerant specific enthalpy Hso also decreases (see Expression 2). That is, the degree of subcooling increases. Conversely, as the rotation speed of the compressor increases, the degree of subcooling decreases.

$$Qc = KA(Tc-Ta) = Gr(Hi-Ho) \quad \text{(Expression 1)}$$

where $Qc$: condensation capacity;

$K$: heat transfer coefficient . . . changeable according to outdoor fan air volume and to outdoor heat exchanger specifications;

$A$: outdoor heat exchanger heat transfer area;

$Tc$: condensation temperature . . . substantially equal to saturated temperature for discharge pressure;

$Ta$: external air temperature;

$Gr$: refrigerant circulation amount . . . changeable according to compressor rotation speed and sucked refrigerant state;

$Hi$: outdoor heat exchanger inlet refrigerant specific enthalpy; and $Ho$: outdoor heat exchanger outlet refrigerant specific enthalpy.

$$Qsc = Gr(Hsi-Hso) \quad \text{(Expression 2)}$$

where $Qsc$: subcooling capacity;

$Hsi$: subcooling circuit inlet refrigerant specific enthalpy; and $Hso$: subcooling circuit outlet refrigerant specific enthalpy.

According to the air-conditioning device of the first embodiment, the degree of subcooling at the outlet of the subcooling circuit 20 is obtained based on the temperature at the outlet of the subcooling circuit 20, and therefore, the degree of subcooling can be properly obtained. Moreover, according to the air-conditioning device of the first embodiment, the average value of the degree of subcooling is obtained, and the control of increasing the rotation speed of the compressor 11 of the outdoor unit 10 having a higher degree of subcooling than the average value and decreasing the rotation speed of the compressor 11 of the outdoor unit 10 having a lower degree of subcooling than the average value is performed. With this configuration, the refrigerant amount can be balanced among the outdoor units 10. Thus, according to the air-conditioning device of the first embodiment, the amount of refrigerant charged to the refrigerant circuit can be properly determined.

Second Embodiment

A second embodiment will be described. Differences from the first embodiment will be mainly described herein. A factor influencing a refrigerant state at an outlet of an outdoor heat exchanger is an outdoor fan rotation speed in addition to a compressor rotation speed. A control section 70a of the second embodiment controls the outdoor fan rotation speed to balance a refrigerant amount.

Figure 5:
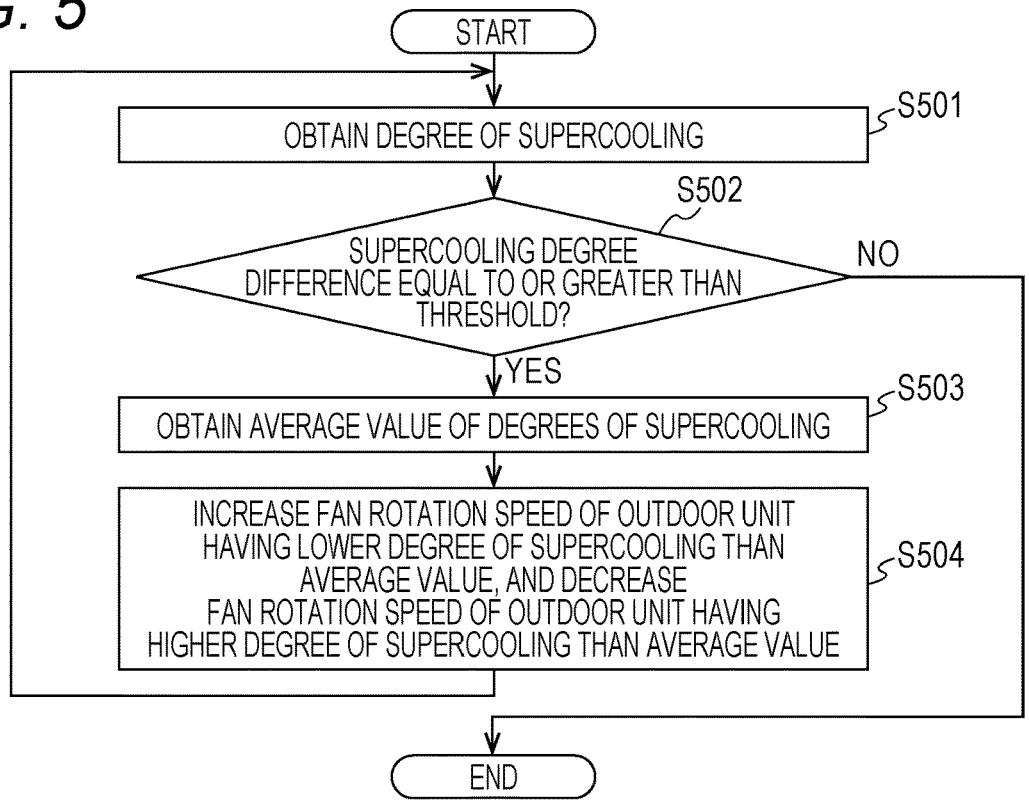
FIG. 5 is a flowchart of one example of refrigerant amount balance control processing of a second embodiment.

FIG. 5 is a flowchart of one example of refrigerant amount balance control processing of the second embodiment. Processing from S501 to S503 is similar to the processing from S401 to S403 in FIG. 4, and therefore, description thereof will be omitted. At S504, a CPU 201 performs the control of increasing the fan rotation speed of an outdoor unit 10 having a lower degree of subcooling than an average value and decreasing the fan rotation speed of an outdoor unit 10 having a higher degree of subcooling than the average value. Although the principle thereof will be described later, the degree of subcooling of the outdoor unit increases as the fan rotation speed increases, and decreases as the fan rotation speed decreases. Thus, according to the present processing, the degree of subcooling among multiple outdoor units can be decreased.

The processing of S504 will be more specifically described. The CPU 201 determines the rotation speed of each outdoor fan 15 such that the increment of the fan rotation speed of the outdoor fan 15 of the outdoor unit 10 having a lower degree of subcooling than the average value and the decrement of the fan rotation speed of the outdoor fan 15 of the outdoor unit 10 having a higher degree of subcooling than the average value are equal to each other.

A relationship between the degree of subcooling and the rotation speed of the outdoor fan will be described herein. As the rotation speed of the outdoor fan increases, a heat transfer coefficient K increases, and therefore, a condensation capacity Qc increases. A refrigerant circulation amount Gr and a condenser inlet refrigerant specific enthalpy Hi show little change, and therefore, a condenser outlet refrigerant specific enthalpy Ho decreases (see Expression 1). That is, a subcooling circuit inlet refrigerant specific enthalpy decreases (Hsi=Ho), and therefore, in the case of a fixed subcooling circuit capacity Qsc, a subcooling circuit outlet refrigerant specific enthalpy Hso also decreases (see Expression 2). That is, the degree of subcooling increases. Conversely, as the rotation speed of the outdoor fan decreases, the degree of subcooling decreases.

According to an air-conditioning device of the second embodiment, the rotation speed of the fan is controlled instead of the rotation speed of the compressor so that the refrigerant amount can be balanced among the outdoor units 10. Thus, according to the air-conditioning device of the second embodiment, the amount of refrigerant charged to a refrigerant circuit can be properly determined.

Third Embodiment

Figure 6:
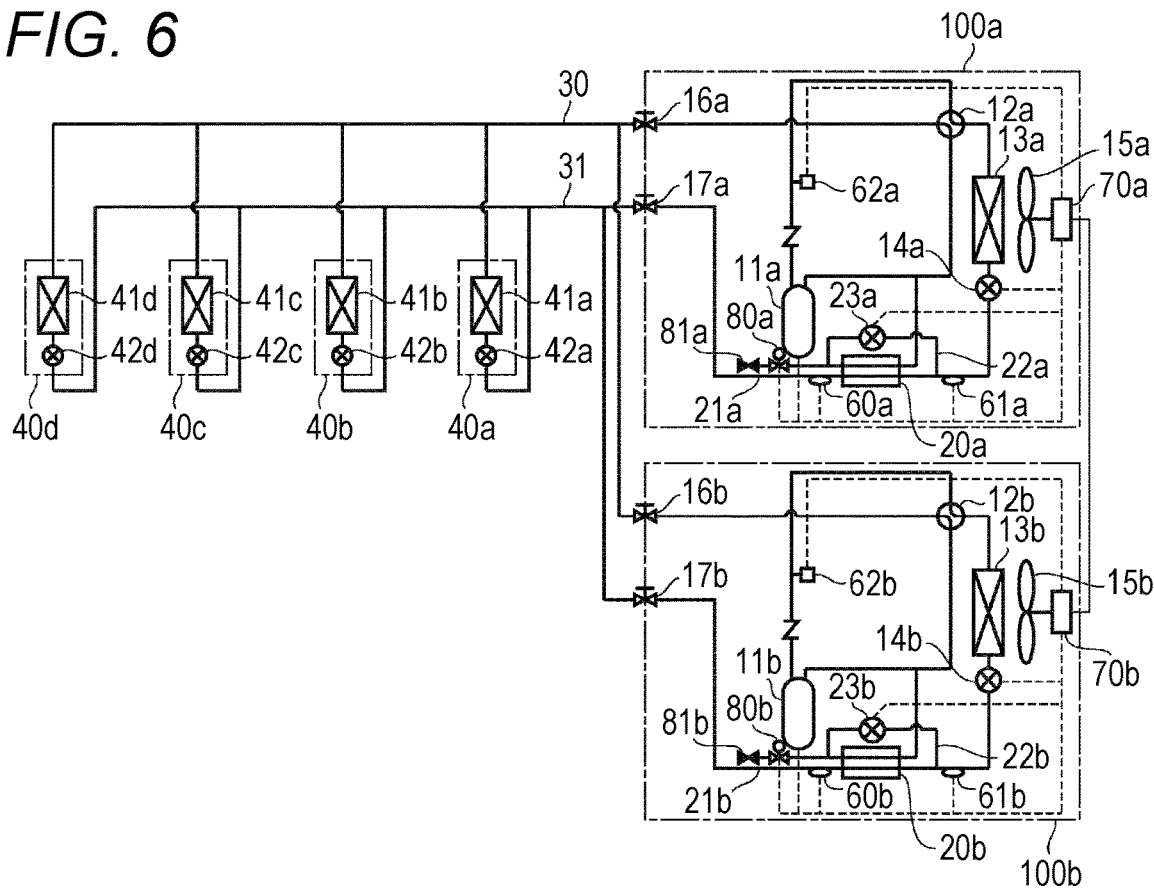
FIG. 6 is a diagram of one example of an outline configuration of an air-conditioning device of a third embodiment.

A third embodiment will be described. Differences from the above-described embodiments will be mainly described herein. FIG. 6 is a diagram of one example of an outline configuration of an air-conditioning device of the third embodiment. A configuration of an outdoor unit 100a will be described. The air-conditioning device of the third embodiment is different from the air-conditioning device of the first embodiment in that a subcooling circuit inlet temperature sensor 61a is provided at a pipe in the vicinity of an inlet of a subcooling circuit 20a in the outdoor unit 100a. A control section 70a of the third embodiment is connected to an outdoor fan 15a, a high-pressure sensor 62a, an outdoor expansion valve 14a, a subcooling expansion valve 23a, a subcooling circuit outlet temperature sensor 60a, a subcooling circuit inlet temperature sensor 61a, a compressor 11a, a refrigerant charging electromagnetic valve 80a, and a control section 70b of an outdoor unit 100b so that a signal can be transmitted or received through a signal line. The subcooling circuit inlet temperature sensor 61a detects the temperature of refrigerant at the pipe in the vicinity of the inlet of the subcooling circuit 20a. A configuration of the outdoor unit 100b is also similar to the configuration of the outdoor unit 100a.

FIG. 7 is a flowchart of one example of refrigerant amount balance control of the third embodiment. At S701, a CPU 201 obtains a temperature difference between the inlet and an outlet of the subcooling circuit 20a based on the temperature detected by the subcooling circuit inlet temperature sensor 61a of the outdoor unit 100a and a temperature detected by the subcooling circuit outlet temperature sensor 60a of the outdoor unit 100a. Moreover, the CPU 201 receives, via the control section 70b, a temperature detected by a subcooling circuit inlet temperature sensor 61b of the outdoor unit 100b and a temperature detected by a subcooling circuit outlet temperature sensor 60b of the outdoor unit 100b. Then, the CPU 201 obtains a temperature difference between an inlet and an outlet of a subcooling circuit 20b based on the temperature detected by the subcooling circuit inlet temperature sensor 61b of the outdoor unit 100b and the temperature detected by the subcooling circuit outlet temperature sensor 60b of the outdoor unit 100b. Note that a CPU 201 of the control section 70b may obtain the temperature difference between the inlet and the outlet of the subcooling circuit 20b based on the temperature detected by the subcooling circuit inlet temperature sensor 61b of the outdoor unit 100b and the temperature detected by the subcooling circuit outlet temperature sensor 60b of the outdoor unit 100b. Then, the CPU 201 of the subcooling circuit 20a may receive, via the control section 70b, the temperature difference between the inlet and the outlet of the subcooling circuit 20b, the temperature difference being obtained by the control section 70b. Instead of the degree of subcooling at the outlet of the subcooling circuit 20 as described in the first embodiment, the temperature difference between the inlet and the outlet of the subcooling circuit 20 is used in the third embodiment.

At S702, the CPU 201 determines whether or not a difference between the temperature difference between the inlet and the outlet of the subcooling circuit 20a of the outdoor unit 100a and the temperature difference between the inlet and the outlet of the subcooling circuit 20b of the outdoor unit 100b is equal to or greater than a threshold. In a case where the CPU 201 determines that the difference is equal to or greater than the threshold, the processing proceeds to S703. In a case where the CPU 201 determines that the difference is less than the threshold, the refrigerant amount balance control processing illustrated in FIG. 7 ends.

At S703, the CPU 201 obtains an average value of the temperature difference based on the temperature difference between the inlet and the outlet of the subcooling circuit 20a of the outdoor unit 100a and the temperature difference between the inlet and the outlet of the subcooling circuit 20b of the outdoor unit 100b. The average value is one example of a target value.

At S704, the CPU 201 performs the control of decreasing the rotation speed of the compressor 11 of the outdoor unit 100 having a smaller temperature difference than the average value and increasing the rotation speed of the compressor 11 of the outdoor unit 100 having a greater temperature difference than the average value. The CPU 201 determines the rotation speed of each compressor 11 such that the total amount of the decrements of the rotation speeds of the compressors 11 of the outdoor units 100 having a smaller temperature difference than the average value and the total amount of the increments of the rotation speeds of the compressors 11 of the outdoor units 100 having a greater temperature difference than the average value are equal to each other. After the processing of S704, the CPU 201 proceeds to S701. The total amount is a preset value, and is two hertzes, for example.

According to the air-conditioning device of the third embodiment, the temperature difference between the inlet and the outlet of the subcooling circuit 20 of the outdoor unit 100 can be utilized instead of the degree of subcooling. That is, according to the air-conditioning device of the third embodiment, the advantageous effects of the first embodiment can be also provided, and an error upon conversion into a saturated temperature can be reduced without the necessity of measuring a pressure by the high-pressure sensor 62 for further obtaining the degree of subcooling.

Fourth Embodiment

A fourth embodiment will be described. Differences from the third embodiment will be mainly described herein. A control section 70a of the fourth embodiment controls an outdoor fan rotation speed to balance a refrigerant amount. FIG. 8 is a flowchart of one example of refrigerant amount balance control processing of the fourth embodiment. Processing from S801 to S803 is similar to the processing from S701 to S703 in FIG. 7, and description thereof will be omitted. At S804, a CPU 201 performs the control of increasing the fan rotation speed of an outdoor unit 100 having a smaller temperature difference than an average value and decreasing the fan rotation speed of an outdoor unit 100 having a greater temperature difference than the average value.

More specifically, the CPU 201 determines the rotation speed of each outdoor fan 15 such that the increment of the fan rotation speed of the outdoor fan 15 of the outdoor unit 100 having a smaller temperature difference than the average value and the decrement of the fan rotation speed of the outdoor fan 15 of the outdoor unit 100 having a greater temperature difference than the average value are equal to each other.

According to the air-conditioning device of the fourth embodiment, the temperature difference between an inlet and an outlet of the subcooling circuit 20 of the outdoor unit 100 can be utilized instead of the degree of subcooling. That is, according to the air-conditioning device of the fourth embodiment, the advantageous effects of the second embodiment can be also provided, and an error upon conversion into a saturated temperature can be reduced without the necessity of measuring a pressure by a high-pressure sensor 62 for further obtaining the degree of subcooling.

(First Variation)

The case of three or more units will be described. At S402, the CPU 201 determines, for the degrees of subcooling of all outdoor units 10, whether or not a difference between the maximum value and the minimum value is equal to or greater than a threshold. In a case where the CPU 201 determines, for the degrees of subcooling of all outdoor units 10, that the difference between the maximum value and the minimum value is equal to or greater than the threshold, the processing proceeds to S403. In a case where the CPU 201 determines, for the degrees of subcooling of all outdoor units 10, that the difference between the maximum value and the minimum value is less than the threshold, the refrigerant amount balance control processing illustrated in FIG. 4 ends.

At S404, the CPU 201 divides the preset increment (two hertzes) by the number of outdoor units 10 having a higher degree of subcooling than the average value, thereby determining the increment of each outdoor unit 10 having a higher degree. Similarly, the CPU 201 divides the preset decrement (two hertzes) by the number of outdoor units 10 having a lower degree of subcooling than the average value, thereby determining the decrement of each outdoor unit 10 having a lower degree.

For example, in a case where the number of outdoor units 10 having a higher degree is two and the number of outdoor units 10 having a lower degree is one, the increment of each outdoor unit 10 is one hertz. With this configuration, the total value of the increments and the total value of the decrements can be constantly held at two hertzes.

(Second Variation)

A second variation will be described. The CPU 201 may further control the rotation speed of each compressor 11 based on the stroke volume of each compressor 11. The control section 70a may store the stroke volume of each compressor 11 in the storage section 202 in advance, or may make an inquiry to the control section 70 of each compressor 11 regarding the stroke volume of each compressor 11 to store, in the storage section 202, the stroke volume of each compressor 11 acquired as an inquiry result. In the case of increasing the compressor rotation speed by the same change amount, the CPU 201 performs such control that the rotation speed of the compressor having a smaller stroke volume is slightly increased as compared to the rotation speed of the compressor having a greater stroke volume based on a reference stroke volume ratio and the rotation speed of the compressor having a greater stroke volume is slightly decreased as compared to the rotation speed of the compressor having a smaller stroke volume based on the reference stroke volume ratio. For example, even in a case where the rotation speeds of two compressors are both to be increased by one hertz, the CPU 201 performs such control that the rotation speed of the compressor having a smaller stroke volume is slightly increased with respect to one hertz and the rotation speed of the compressor having a greater stroke volume is slightly decreased with respect to one hertz. In this case, the CPU 201 also adjusts each of the total amount of the increments and the total amount of the decrements to two hertzes in reference stroke volume equivalent.

According to the air-conditioning device of the second variation, the refrigerant amount balance control among the outdoor units can be performed considering the stroke volume of the compressor. In the second variation, the first embodiment has been described by way of example, but the same applies to other embodiments.

(Third Variation)

A third variation will be described. In the above-described embodiments, description has been made using the average value of the subcooling degree or the temperature difference (hereinafter referred to as an "index value") as the example of the target value. As long as the target value may be a value obtained based on multiple index values obtained for each of the multiple outdoor units, the target value is not limited to those of the embodiments. More preferably, the target value may be one of multiple index values between the maximum value and the minimum value. For example, the target value may be a medium value of the multiple index values. With this configuration, the refrigerant amount can be efficiently balanced.

(Fourth Variation)

A fourth variation will be described. In each of the above-described embodiments, the outdoor unit 10a, the control section 70a of the outdoor unit 10a, etc. have been described as examples of the control device configured to perform the refrigerant charging control processing to control the air-conditioning device. Note that in a case where the air-conditioning device further has a management device configured to manage the indoor unit and the outdoor unit, the management device may perform the refrigerant charging control processing. As described above, the control device is not limited to the outdoor unit 10a. Other examples include an example where in a case where the air-conditioning device is communicably connected to an external device with or without wire, the external device may perform the refrigerant charging control processing.

(Fifth Variation)

A fifth variation will be described. In each of the above-described embodiments, the subcooling bypass pipe 22a etc. have been described as examples of the cooling source of the subcooling circuit 20a. Note that an external heat source as the cooling source of the subcooling circuit 20a may be utilized.

As described above, according to each of the above-described embodiments, the amount of refrigerant charged to the refrigerant circuit can be properly determined.

As described above, the example embodiments of the present invention have been described in detail, but the present invention is not limited to these specific embodiments.

The invention claimed is:

1. An air-conditioning device including multiple outdoor units and an indoor unit connected to the multiple outdoor units through a pipe, comprising:
   a control section configured to:
   obtain, before refrigerant charging to a refrigerant circuit including the multiple outdoor units and the indoor unit is completed, a degree of subcooling at an outlet of a subcooling circuit of each outdoor unit based on a temperature detected by a temperature sensor configured to detect a temperature of refrigerant having passed through the subcooling circuit of each outdoor unit,
   obtain a target value of the degree of subcooling based on the obtained degrees of subcooling from each outdoor unit, and
   perform a control of increasing a rotation speed of each compressor of each outdoor unit having a higher degree of subcooling than the target value by a value determined by dividing a preset increment by a number of outdoor units having the higher degree of subcooling than the target value, and decreasing a rotation speed of each compressor of each outdoor unit having a lower degree of subcooling than the target value by a value determined by dividing a preset decrement by a number of outdoor units having the lower degree of subcooling than the target value, such that a difference in the degree of subcooling at the outlet of the subcooling circuit of all the outdoor units is decreased.

2. The air-conditioning device according to claim 1, wherein
   the control section determines, after the control, whether or not an amount of refrigerant charged to the refrigerant circuit is proper.

3. The air-conditioning device according to claim 1, wherein
   the control section obtains, as the target value, an average value of the degrees of subcooling based on the obtained multiple degrees of subcooling.

4. The air-conditioning device according to claim 1, wherein
   the control section determines, for the obtained multiple degrees of subcooling, whether or not the difference is equal to or greater than a threshold, and
   upon determining, for the obtained multiple degrees of subcooling, the difference is equal to or greater than the threshold, obtain the target value of the degree of subcooling based on the obtained multiple degrees of subcooling.

5. An air-conditioning device including multiple outdoor units and an indoor unit connected to the multiple outdoor units through a pipe, comprising:
   a control section configured to:
   obtain, before refrigerant charging to a refrigerant circuit including the multiple outdoor units and the indoor unit is completed, a refrigerant temperature difference between an inlet and an outlet of a subcooling circuit of each outdoor unit based on a temperature detected by a first temperature sensor configured to detect a temperature of refrigerant having passed through the subcooling circuit of each outdoor unit and a temperature detected by a second temperature sensor configured to detect a temperature of refrigerant before the refrigerant passes through the subcooling circuit of each outdoor unit,
   obtain a target value of the temperature difference based on the obtained refrigerant temperature differences of each outdoor unit, and
   perform a control of increasing a rotation speed of each compressor of each outdoor unit having a greater temperature difference than the target value by a value determined by dividing a preset increment by a number of outdoor units having the higher degree of subcooling than the target value, and decreasing a rotation speed of each compressor of each outdoor unit having a smaller temperature difference than the target value by a value determined by dividing a preset decrement by a number of outdoor units having the lower degree of subcooling than the target value, such that a difference in the refrigerant temperature difference between the inlet and the outlet of the subcooling circuit of all of the outdoor units is decreased.

6. The air-conditioning device according to claim 5, wherein
   the control section obtains, as the target value, an average value of the temperature differences based on the obtained multiple temperature differences.

7. The air-conditioning device according to claim 5, wherein
   the control section determines, for the obtained multiple temperature differences, whether or not the difference is equal to or greater than a threshold, and
   upon determining, for the obtained multiple temperature differences, that the difference is equal to or greater than the threshold, obtain the target value of the temperature difference based on the obtained multiple temperature differences.

8. The air-conditioning device according to claim 5, wherein
   the control section determines, after the control, whether or not an amount of refrigerant charged to the refrigerant circuit is proper.

* * * * *